United States Patent [19]

Tourangeau

[11] Patent Number: 5,052,604
[45] Date of Patent: Oct. 1, 1991

[54] GOLF CART ATTACHMENT

[76] Inventor: Donald R. Tourangeau, 7756 SW. Green Valley Ter., Portland, Oreg. 97225

[21] Appl. No.: 628,386

[22] Filed: Dec. 14, 1990

[51] Int. Cl.⁵ .............................................. B60R 9/08
[52] U.S. Cl. ................................. 224/274; 224/42.07
[58] Field of Search ......... 224/274, 42.03 R, 42.03 A, 224/42.07; 248/96

[56] References Cited

U.S. PATENT DOCUMENTS

| | | | |
|---|---|---|---|
| 3,203,605 | 8/1965 | Karl | 224/42.07 |
| 3,650,443 | 3/1972 | Haskett et al. | 224/42.03 A |
| 4,336,897 | 6/1982 | Luck | 224/42.03 B |
| 4,355,746 | 10/1982 | Casady | 224/274 |
| 4,452,385 | 6/1984 | Prosen | 224/321 |
| 4,461,413 | 7/1984 | Hoerner | 224/311 |
| 4,533,013 | 8/1985 | Hightower | 224/274 X |
| 4,726,597 | 2/1988 | Hickin | 280/47.17 |
| 4,785,980 | 11/1988 | Redick | 224/43.03 A |

Primary Examiner—Renee S. Luebke
Attorney, Agent, or Firm—Kolisch, Hartwell, Dickinson, McCormack & Heuser

[57] ABSTRACT

An auxiliary golf bag carrier is intended for use on a golf cart which has a rear bumper and a canopy support and/or a seat-back support, wherein the carrier is attached to the golf cart such that no structural pieces of the golf cart need be modified to attach or remove the carrier. The auxiliary carrier includes a rectangular base plate for supporting the golf bags, brackets for connecting the base plate to the golf cart, a vertical support carried on the base plate and extending upwardly therefrom, which includes an upright member fixed to each side of the base plate, and a cross piece joining the tops of the upright members. A bag holder is fixed to the vertical support for holding golf bags in a desired position. An adjustable-length strap extends from the vertical support to the golf cart through a buckle arrangement which allows the auxiliary carrier to be properly positioned on the golf cart. A restraining bar, which engages the canopy support or seat-back support of the golf cart, is attached to the free end of the adjustable-length strap in one embodiment of the invention. The adjustable-length strap may be directly attached to a canopy support cross piece if such a structure is available.

14 Claims, 6 Drawing Sheets

GOLF CART ATTACHMENT

BACKGROUND OF THE INVENTION

The invention relates to attachments for golf carts, and specifically to a universally mountable attachment which will allow a golf cart to carry additional golf bags.

Many golfers prefer to walk a golf course to obtain health benefits from the sport. However, a significant number of golfers are, for various reasons, unable to play a complete round of golf without the use of a riding, typically gasoline or battery-powered, golf cart. Some golfers are able to walk the entire course only if they do not have to carry or wheel their golf bag and clubs. Other golfers simply may prefer to walk a part of the course and ride the cart over other parts of the course.

Because golf carts generally carry only two passengers, and hold only two golf bags, the walk/ride problem may be solved, for a foursome, by using two carts, which requires that two people drive while the other two members of the foursome have the option of walking.

Another solution is to provide an attachment device for a golf cart which will enable it to carry four golf bags. Such devices are known, but are generally of the home-made variety, or are provided by cart manufacturers and are specific to a particular brand of cart. Additionally, such devices are usually permanently attached to the golf cart, making the cart unnecessarily cumbersome for use by a twosome, with only two golf bags.

Battery-powered golf carts must be recharged after use. Carts are usually grouped together for recharging. An auxiliary carrier which is permanently attached to a cart effectively makes the cart longer, thereby requiring more space for the cart and making a grouping of carts larger than is necessary without the auxiliary carrier.

An object of the invention is to provide a universally mountable auxiliary golf bag carrier for use on a golf cart wherein no structural modifications need be made to the golf cart in order to attach or remove the auxiliary golf bag carrier.

Another object of the invention is to provide an auxiliary golf bag carrier which includes means for connecting the carrier to the rear bumper of a golf cart and to the canopy or seat-back supports of the cart.

A further object of the invention is to provide an auxiliary golf bag carrier which may be attached to a golf cart with the golf bags strapped in place on the auxiliary carrier.

Still another object of the invention is to provide an auxiliary golf bag carrier which may easily be removed for recharging of a golf cart.

Another object of the invention is to provide an auxiliary golf bag carrier which may be collapsed for compact transport and storage.

SUMMARY OF THE INVENTION

The auxiliary golf bag carrier of the invention is intended for use on a golf cart which has a rear bumper and a canopy and/or seat-back support, wherein the carrier is attached to the golf cart such that no structural pieces of the golf cart need be modified to attach or remove the carrier. The auxiliary carrier includes a rectangular base plate for supporting the golf bags, brackets for connecting the base plate to the golf cart, a vertical support carried on the base plate and extending upwardly therefrom, which includes an upright member fixed to each side of the base plate, and a cross piece joining the tops of the upright members. A bag holder is fixed to the vertical support for holding the golf bags in a desired position. An adjustable-length strap extends from the vertical support to the golf cart through a buckle arrangement which allows the auxiliary carrier to be properly positioned on the golf cart and which, in one embodiment, includes a restraining bar, which is attached to the free end of the adjustable-length strap, and engages the canopy or seat-back supports of the golf cart.

These and other objects and advantages of the invention will become more fully apparent as the description which follows is read in conjunction with the drawings.

DETAILED DESCRIPTION OF THE PREFERRED EMBODIMENT

Figure 1:
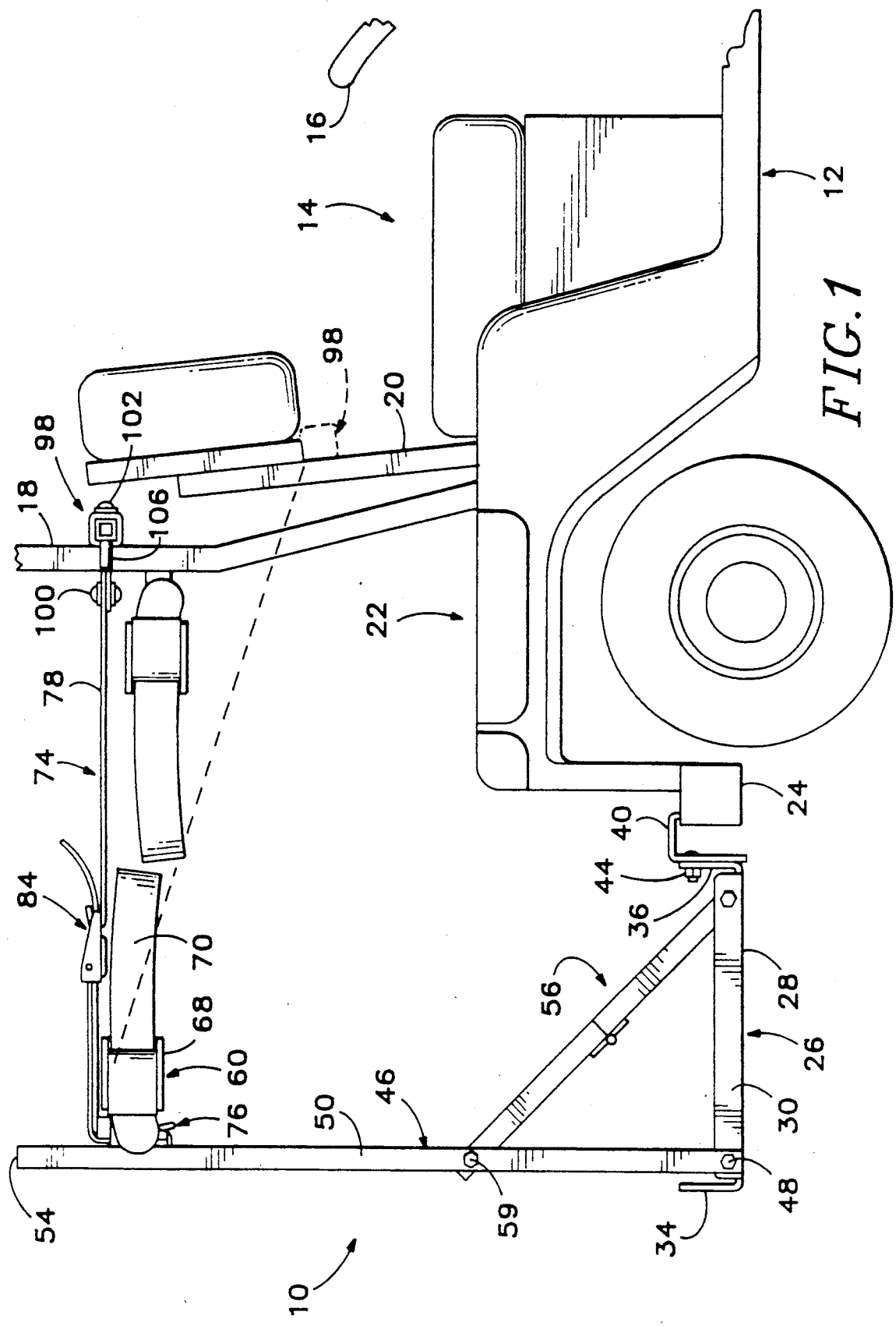
FIG. 1 is a side elevation of the auxiliary golf bag carrier of the invention depicted with a golf cart to which the carrier is attached.
Figure 2:
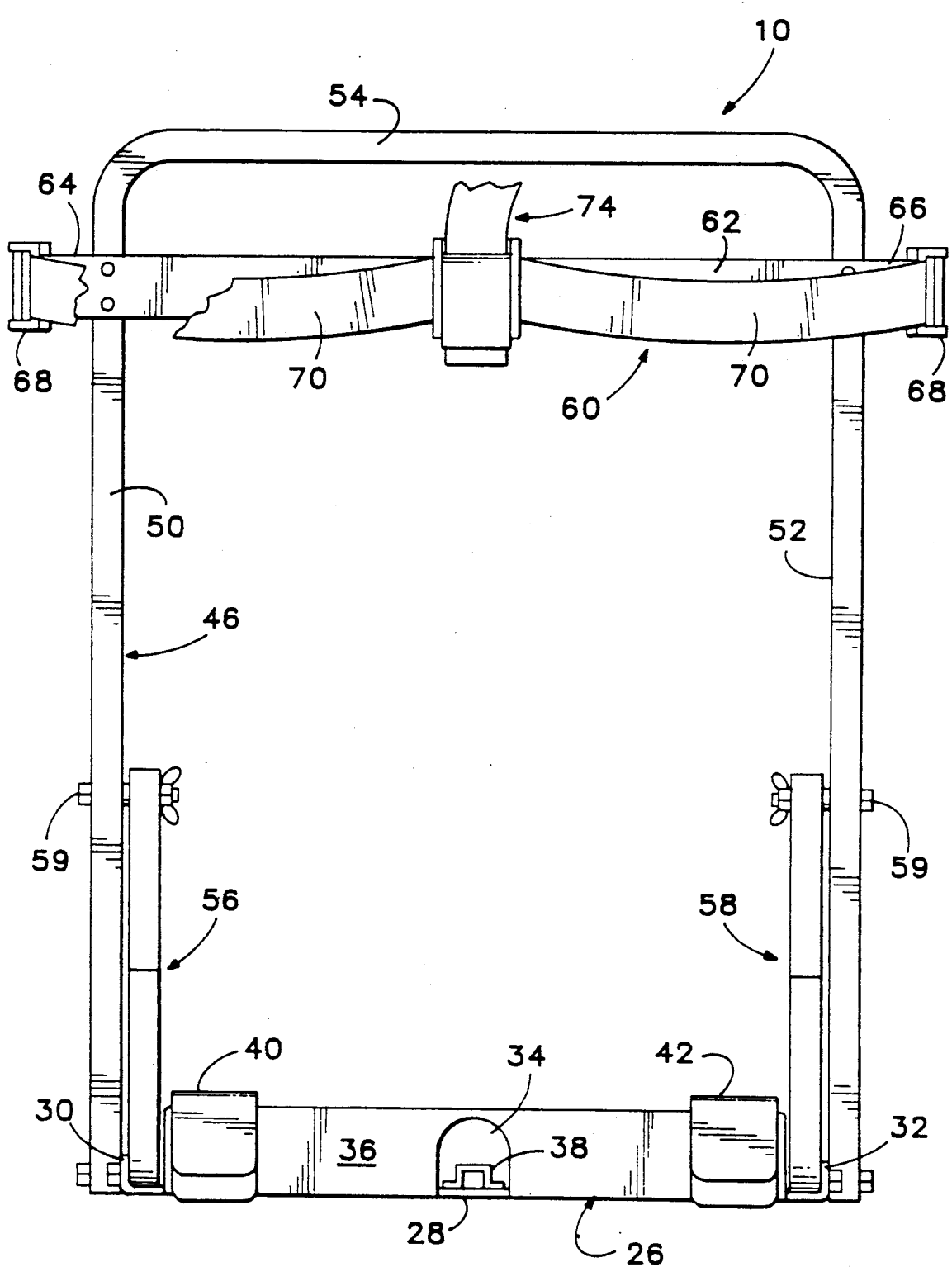
FIG. 2 is a front elevation of the carrier of FIG. 1.
Figure 3:
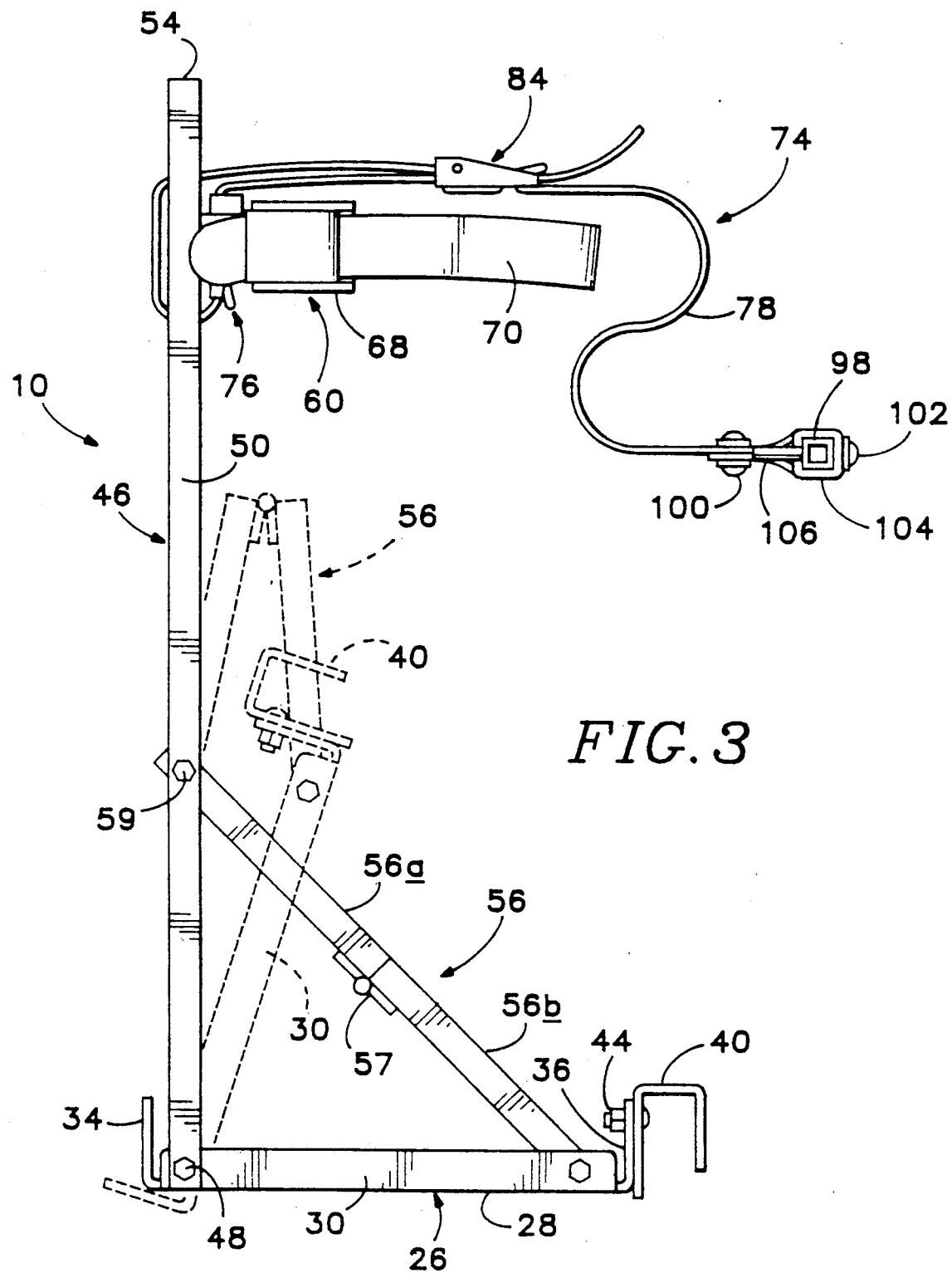
FIG. 3 is a side elevation of the carrier of FIG. 1.

Referring now to the drawings, and specifically to FIGS. 1-4, an auxiliary golf bag carrier constructed according to the invention is shown generally at 10. Carrier 10 is shown, in FIG. 1, attached to a golf cart 12. By way of background, golf cart 12 includes a passenger area 14, steering tiller 16, canopy support 18, seat-back support 20, a golf bag receiving area 22, and a rear bumper 24. Canopy support 18 and seat-back support 20 are collectively referred to herein as support means.

Carrier 10 includes a rectangular base plate 26 having a floor portion 28 which supports golf bags. In the preferred embodiment, base plate 26 includes, at its edges, up-turned, spaced-apart sides 30, 32, an up-turned rear flange 34 and a front flange 36. The up-turned sides and front and rear flanges provide rigidity to floor portion 28. A divider structure 38 is provided and extends substantially between rear flange 34 and front flange 36. Divider structure 38 substantially, evenly divides floor portion 28 in half and provides stability for a golf bag carried in carrier 10, preventing the lower portions of the bag from shifting from one side of the base plate to the other in the event that only one bag is placed in carrier 10.

Brackets 40, 42 are fastened to front flange 36 by means of fasteners 44, which in the preferred embodiment are a nut and bolt combination. In the preferred embodiment, brackets 40, 42, also referred to herein as means for connecting the base plate to the golf cart, are substantially U-shaped, hook-like structures and are constructed and arranged to fit over rear bumper 24 of golf cart 12. This construction provides for easy attachment and removal of the carrier from the golf cart without requiring modification to the rear bumper of the golf cart, or even the permanent attachment of any auxiliary device to the rear bumper or other structure of the golf cart.

Carrier 10 includes a vertical support 46 which is carried on the base plate, and is secured adjacent the rear edge thereof to the side flanges thereof by fasteners 48. Vertical support 46 includes a pair of spaced-apart upright members 50, 52 which are fixed to sides 30, 32, respectively, and extend upwardly therefrom. A cross piece 54 joins the tops of the upright members. In the preferred embodiment, the upright members and cross piece are fabricated by unitary construction from tubular material having a substantially square cross section. A pair of diagonally extending supports 56, 58 are attached to upright members 50, 52 and to sides 30, 32, respectively, adjacent the front edge of base plate 26 to provide stability for vertical support 46. Diagonally extending supports 56, 58 include upper portions 56a, 58a, and lower portions 56b, 58b, respectively, which are joined by hinges 57, to provide an articulated structure.

Suitable fasteners are provided to connect diagonal supports 56, 58 to base plate 26 and vertical support 46. Fasteners 59 may include a bolt and wing-nut combination which enables a carrier user to release tension on diagonal supports 56, 58, thereby allowing articulation of supports 56, 58, or fastener 59 may be removed completely, allowing separation of supports 56, 58 from vertical support 46, thereby allowing carrier 10 to be folded, with base plate 26 being folded towards vertical support 46, for compact transport and storage, as depicted by the dashed lines in FIG. 3.

A bag holder 60 is attached to the vertical support and is operable to hold the golf bags placed in carrier 10 in a desired position. Bag holder 60 also provides an anchor point for securing the upper portion of the carrier to the golf cart.

In the preferred embodiment, bag holder 60 is a substantially U-shaped structure and includes a transverse portion 62 which forms the base of the "U" and extends between upright members 50, 52, and forwarding projecting portions, or legs, 64, 66, which project forward, outboard, of vertical support 46 and provide lateral stability for the golf bags carried in carrier 10. Each forward projecting portion carries a buckle, or strap receiver, 68 thereon, which is operable to receive a free end of a bag strap 70. Bag strap 70 is fixed to transverse portion 62, and is trainable about a golf bag, such as bag 72, which is carried on one side of the base plate. Bag strap 70 is, in the preferred embodiment, continuous to the other side of carrier 10, where it is trainable through another buckle 68.

An adjustable-length strap 74 is provided and extends from transverse portion 62 to the golf cart. In the preferred embodiment, a first pass-through buckle 76 is fixed intermediate the ends of transverse portion 62 and receives a web portion 78 of strap 74. Pass-through buckle 76 is fixed to transverse portion 62 such that bag strap 70 is sandwiched between buckle 76 and transverse portion 62. Buckle 76 includes a fixed piece 80 and a clasping piece 82. A first strap-training buckle 84 is provided and located intermediate the ends of web 78 to provide additional security for maintaining carrier 10 on cart 12.

Figure 5:
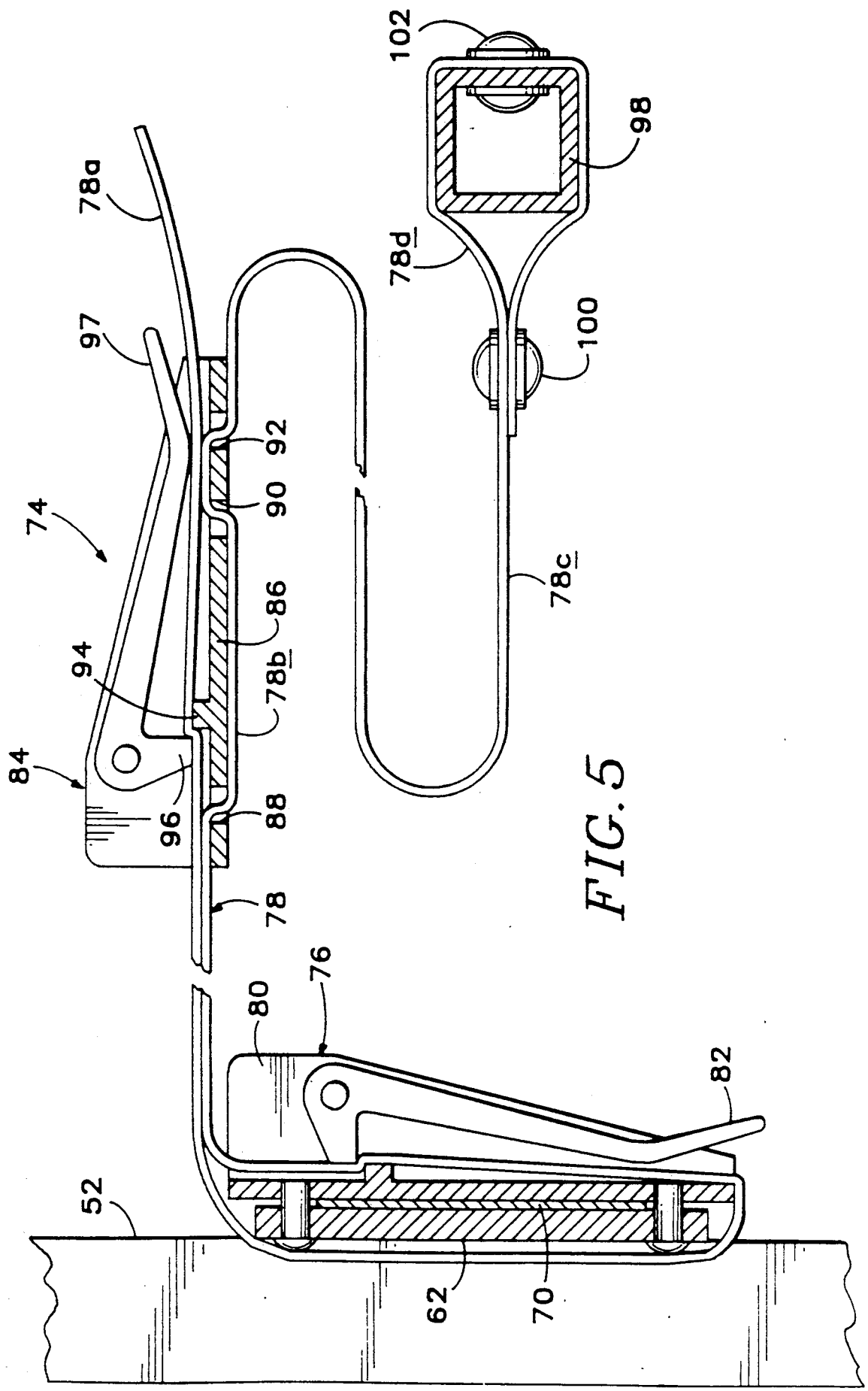
FIG. 5 is a greatly enlarged view of a first embodiment of the adjustable-length strap and retaining bar of the invention.

Referring momentarily to FIG. 5, strap-training buckle 84 has an elongate floor piece 86, having transversely extending slots, such as slots 88, 90 and 92 located adjacent the ends thereof. A first slot 88 is located adjacent one end of the floor piece, while slots 90, 92 are slightly spaced apart from one another and are located adjacent the other end of floor piece 86. A raised portion 94 extends transversely of floor piece 86 intermediate the slots. An engagement piece 96, which is rotatable relative to floor piece 86, is constructed and arranged to trap the free end 78a of web 78 between engagement piece 96 and raised portion 94. A clasping piece 97 carries engagement piece 96 thereon. An intermediate stretch 78b of web 78 is trained through floor piece 86 such that it enters the buckle through the bottom side thereof through slot 92, exits through slot 90, extends along the bottom side of the buckle for a distance, and reenters through slot 88, thus maintaining the buckle in a desired location on the web.

Figure 4:
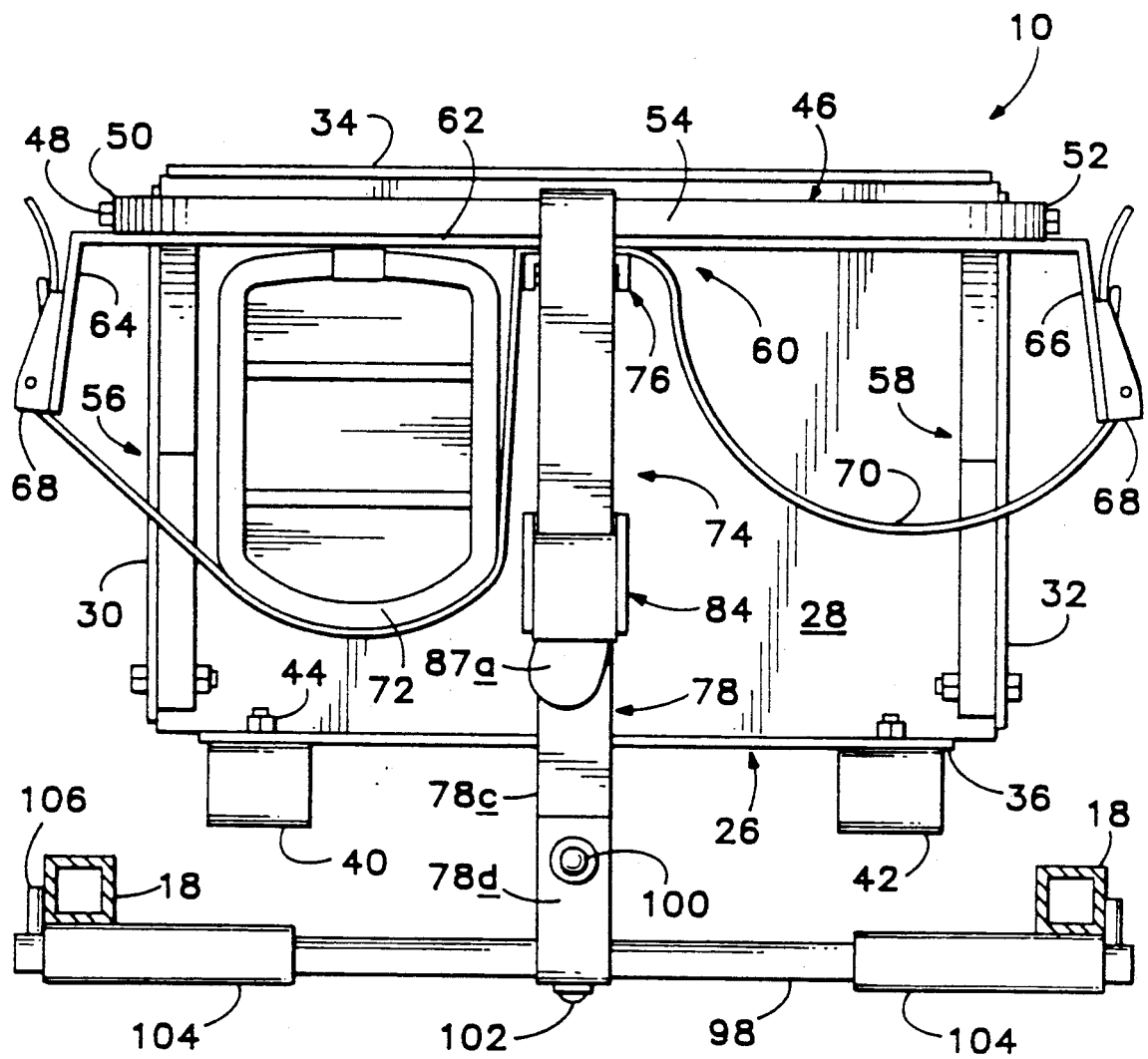
FIG. 4 is a top plan view of the carrier of FIG. 1.

In one embodiment of the invention, and now referring to FIGS. 1, 4 and 5, the other end 78c of web 78 is secured to a restraining bar 98 which engages canopy support 18 or seat-back support 20 of golf cart 12. Restraining bar 98, also referred to herein as means for attaching the free end 78a of web 78 to golf cart 12, is received in a loop 78d of web 78 which is closed by a fastener 100. Restraining bar 98 is fixed to loop 78d by another fastener 102. Restraining bar 98 includes a covering 104 at either end thereof, which is provided to protect the surface of both restraining bar 98 and supports 18 or 20.

In one embodiment, as shown at the left side of FIG. 4, a pin 106, which extends toward carrier 10, may be provided to enhance lateral stability of restraining bar 98 relative to golf cart 10. A pin 106 is provided at each end of the restraining bar, if desired. Restraining bar 98 is positioned on canopy supports 18 or seat-back supports 20 such that pins 106 are outboard of the supports, thereby preventing lateral shifting of restraining bar 98 when the restraining bar is forced against the supports by the weight of carrier 10. Thus, carrier 10 may be hung on the rear bumper of cart 10 and supported by means of brackets 40, 42 while the upper extent of the carrier is prevented from tipping backward by means of adjustable-length strap 74 and restraining bar 98.

Figure 6:
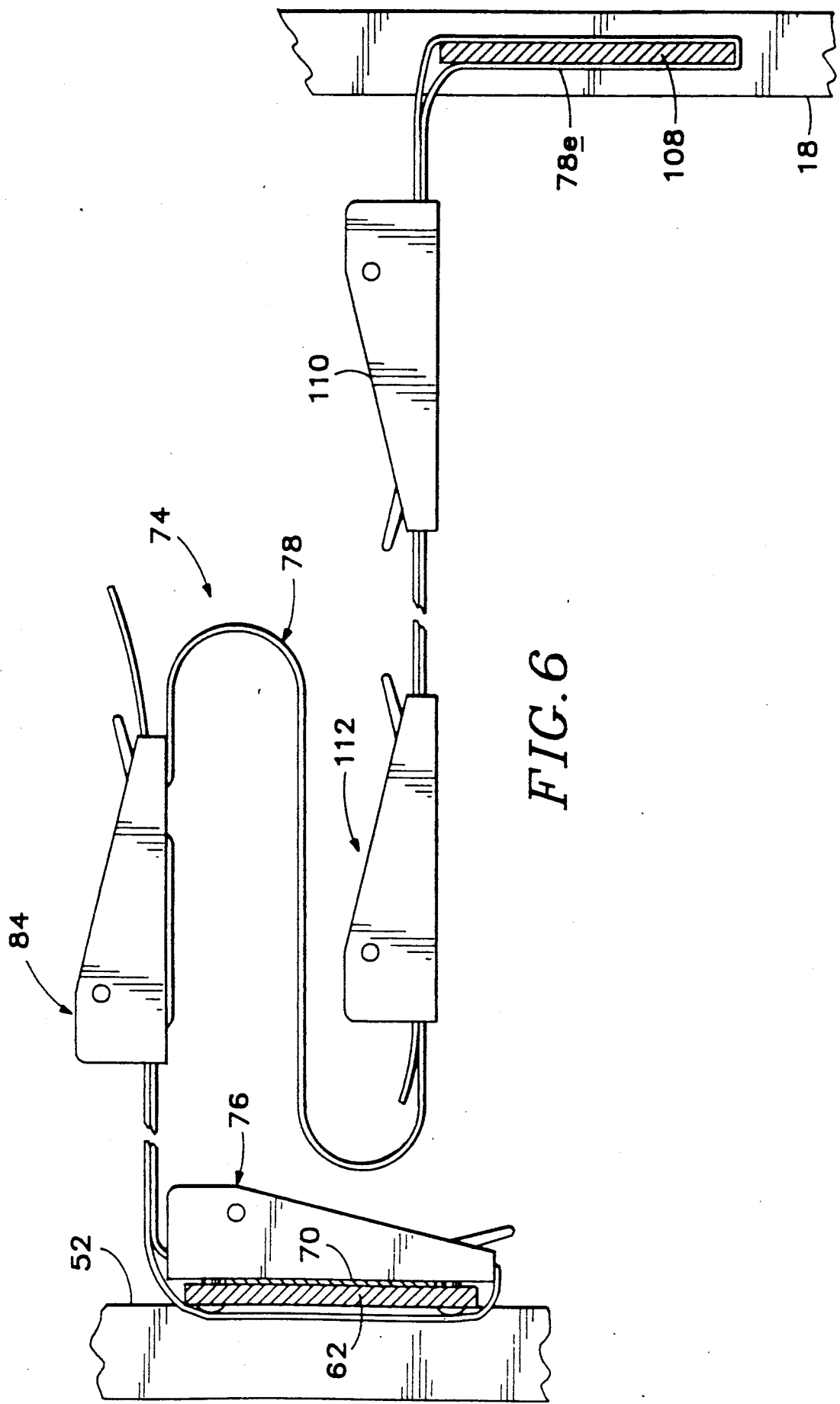
FIG. 6 is a modified embodiment of the adjustable-length strap of the invention.

Referring now to FIG. 6, in those cases where supports 18 or 20 have a cross piece, such as cross piece 108, which may be the bag-strap bar which is part of cart 12, extending therebetween, restraining bar 98 is not required. A second form of means for attaching free end 78c of web 78 to cart 12 includes a loop of web 78e formed in a free end of web 78, which may be passed around a support cross piece 108 and secured with an additional set of buckles, such as buckle 110 and buckle 112. In this embodiment, buckle 110 is constructed as is first buckle 76 while buckle 112 is constructed as is second buckle 84. Adjustable-length strap end 78c is trained through buckles 110, 112 as described in connection with buckles 76, 84, respectively.

INSTALLATION AND OPERATION

Carrier 10 may be installed on cart 12 by lifting the carrier to position brackets 40, 42 over rear bumper 24 and securing adjustable-length strap 74 to the cart canopy supports 18 or seat-back supports 20.

When restraining bar 98 is used, the bar is placed against the forward-facing side of canopy support 18. If pins 106 are provided, they are located outboard of the supports and facing rearward. Carrier 10 is adjusted relative to cart 12 by fixing the length of adjustable-length strap 74. Clasping pieces 82 and 97 are released to allow web 78 freely to move in buckles 76 and 84, respectively. Web 78 is adjusted until base plate 26 is level with the surface on which cart 12 is resting, or possibly adjusted such that the rear of the base plate is relatively slightly higher than the front of the base plate to allow for settling when the golf bags are placed in the carrier. Once the carrier is adjusted, buckle 76 is closed on web 78 by rotating clasping piece 82. Buckle 84 may then be adjusted along the intermediate portion 78b of web 78, such that free end 78a extends a short distance beyond buckle 84. Web 78 is trained in strap-training buckle 84 to prevent movement of the web relative to the buckle. Web 78 is then secured in buckle 84 by closing clasping piece 97. One or two golf bags may then be placed in carrier 10 and secured by means of strap 70 and buckle(s) 68.

If cart 12 has a crosspiece 108 extending between supports 18, carrier 10 may be positioned on rear bumper 24 with brackets 40, 42, and end 78c of web 78 may be adjusted with buckles 110 and 112. The carrier may then be leveled by adjusting web 78 as previously described, and the golf bags loaded and secured.

If desired, carrier 10 may be removed from cart 12 with golf bags 72 in place by release adjustable-length strap 74 from the cart and lifting the carrier free of the rear bumper of the cart. Likewise, a loaded carrier may also be placed on a golf cart, or easily moved from one cart to another.

At the end of the day, the auxiliary carrier is removed from any cart which has an auxiliary carrier installed thereon prior to recharging the cart. A number of carts may be assembled in a tightly packed group for recharging. Carrier 10 may be folded by releasing tension on fasteners 59 and shifting base plate 26 towards vertical support 46. This enables compact storage or transportation of the carrier.

Thus an auxiliary golf bag carrier has been disclosed which will enable a conventional golf cart to carry additional golf bags and clubs. The use of carrier 10 enables a number of golfers to transport their clubs and one or two of their number while allowing other golfers to walk the course. Although a preferred embodiment of the invention, and an alternate form thereof, has been disclosed, it should be appreciated that further variations and modifications may be made thereto without departing from the scope of the invention as defined in the appended claims.

What I claim is:

1. A universally mountable auxiliary golf bag carrier for use on a golf cart having a rear bumper and a support means comprising:

a rectangular base plate for supporting golf bags;
   brackets fixed to said base plate for connecting said base plate to the rear bumper of the golf cart;
   a vertical support carried on said base plate and extending upwardly therefrom;
   a bag holder fixed to said vertical support for holding golf bags in a desired position, said bag holder including a transverse portion and a forward projecting portion located at each side thereof, each forward projecting portion carrying a buckle thereon, said bag holder further including a bag strap which is fixed to said transverse portion, which is trainable about a golf bag carried on said base plate, and which is secured to one of said buckles on said forward projecting portions; and
   an adjustable-length strap extending from said vertical support to the golf cart.

2. The auxiliary golf bag carrier of claim 1 wherein said base plate includes a front edge and a rear edge and which further includes a divider structure which extends between the front edge and rear edge of said base plate, substantially evenly dividing said base plate in half.

3. The auxiliary golf bag carrier of claim 1 wherein the carrier is attached to the golf cart such that no additional pieces need be permanently fixed to the golf cart nor structural pieces of the golf cart need be modified to attach or remove the carrier.

4. The auxiliary golf bag carrier of claim 1 which further includes a restraining bar which engages the support means of the golf cart and is attached to said adjustable-length strap.

5. The auxiliary golf bag carrier of claim 4 wherein said restraining bar includes a pin located adjacent each end thereof for positioning said restraining bar laterally relative to the support means.

6. The auxiliary golf bag carrier of claim 1 wherein said adjustable-length strap is secured through a first pass-through buckle which is mounted on said bag holder and through a first strap-training buckle which is located intermediate the ends of said strap, said strap-training buckle having an elongate floor piece, with a first transversely extending slot located adjacent one end thereof, and a pair of spaced-apart transversely extending slots located adjacent the other end thereof, and a raised portion extending transversely thereof intermediate said slots, and an engagement piece which is rotatable relative to said floor piece, and which is constructed and arranged to trap said strap between said engagement piece and said raised portion.

7. The auxiliary golf bag carrier of claim 6 wherein the free end of said strap includes a second pass-through buckle and a second strap-training buckle, and wherein said adjustable-length strap is directly attached to the support means.

8. The auxiliary golf bag carrier of claim 1 which includes diagonally extending supports which extend between said base plate and an intermediate stretch of said vertical support, and wherein said diagonally extending support, said base plate, and said vertical support are constructed and arranged to allow folding of said base plate towards said vertical support for compact transport and storage.

9. The auxiliary golf bag carrier of claim 8 wherein said vertical support includes upright members fixed to each side of said base plate and a cross piece joining the tops of said upright members, wherein said bag holder transverse portion extends between said upright members, and wherein said diagonally extending supports extend from the sides of the base plate to the upright members of the vertical support and includes a hinge to allow articulation of said diagonally extending support.

10. A universally mountable auxiliary golf bag carrier for use on a golf cart having a rear bumper and a support means, wherein the carrier is attached to the golf cart such that no structural pieces of the golf cart need be modified to attach or remove the carrier, comprising:

a rectangular base plate for supporting golf bags;
   brackets fixed to said base plate for connecting said base plate to the rear bumper of the golf cart;
   a vertical support carried on said base plate and extending upwardly therefrom, said vertical support including an upright member fixed to each side of said base plate and a cross piece joining the tops of said upright members;
   a bag holder fixed to said vertical support for holding golf bags in a desired position, said bag holder including a transverse portion extending between said upright members and a forward projecting portion located at each side thereof outboard of said vertical support, each forward projecting portion carrying a buckle thereon, said bag holder further including a bag strap which is fixed to said transverse portion, which is trainable about a golf bag carried on said base plate, and which is secured to one of said buckles on said forward projecting portions;

an adjustable-length strap extending from said vertical support to the golf cart; and means for attaching the free end of said adjustable-length strap to the golf cart.

11. The auxiliary golf bag carrier of claim 10 wherein said adjustable-length strap is secured, at one end thereof, through a first pass through buckle which is mounted on said bag holder and through a first strap-training buckle which is located intermediate the ends of said strap, and wherein the other end of said adjustable-length strap includes a second pass-through buckle and a second strap-training buckle, and wherein said adjustable-length strap is directly attached to the support means.

12. The auxiliary golf bag carrier of claim 10 which includes articulated diagonal supports which extend between the side of said base plate and an intermediate stretch of said vertical support, and wherein said diagonal support, said base plate, and said vertical support are constructed and arranged to allow folding of said base plate towards said vertical support for compact transport and storage.

13. The auxiliary golf bag carrier of claim 10 and which further includes a restraining bar which engages the support means of the golf cart and is attached to the free end of said strap.

14. The auxiliary golf bag carrier of claim 13 wherein said restraining bar includes a pin located adjacent each end thereof for positioning said restraining bar laterally relative to the support means.

* * * * *